(12) United States Patent
Nakamura et al.

(10) Patent No.: US 8,538,620 B2
(45) Date of Patent: Sep. 17, 2013

(54) CREEP CUT-OFF CONTROL DEVICE FOR ELECTRIC VEHICLE

(75) Inventors: Yohei Nakamura, Sagamihara (JP); Isamu Kazama, Odawara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/704,806

(22) PCT Filed: May 13, 2011

(86) PCT No.: PCT/JP2011/061054
§ 371 (c)(1),
(2), (4) Date: Dec. 17, 2012

(87) PCT Pub. No.: WO2012/002050
PCT Pub. Date: Jan. 5, 2012

(65) Prior Publication Data
US 2013/0090799 A1 Apr. 11, 2013

(30) Foreign Application Priority Data
Jun. 30, 2010 (JP) .................................. 2010-150044

(51) Int. Cl.
*B60L 9/00* (2006.01)
(52) U.S. Cl.
USPC .......................................................... 701/22

(58) Field of Classification Search
None
See application file for complete search history.

(56) References Cited

U.S. PATENT DOCUMENTS

| 5,457,363 A * | 10/1995 | Yoshii et al. ................... 318/432 |
| 6,377,007 B1 * | 4/2002 | Ozaki et al. ................... 318/432 |
| 2012/0245773 A1 * | 9/2012 | Suzuki et al. ................... 701/22 |

FOREIGN PATENT DOCUMENTS

| JP | 2000-102113 A | 4/2000 |
| JP | 2007-236168 A | 9/2007 |
| JP | 2010-093990 A | 4/2010 |

* cited by examiner

*Primary Examiner* — Thomas Tarcza
*Assistant Examiner* — Adam Alharbi
(74) *Attorney, Agent, or Firm* — Foley & Lardner LLP

(57) ABSTRACT

A vehicle speed VSP enters a creep-cutoff-prohibiting speed region lower than V1 with a forward creep torque being outputted (t1), and then this state continues for a time duration set corresponding to a timer value NTM1 (t2). At this time, a creep cutoff is prohibited by setting a creep-cutoff-prohibition flag NFLAG at "1". A braking force becomes larger than or equal to a creep-cutoff-permitting braking-force value to satisfy a creep-cutoff permitting condition related to the braking force (t3) while a creep-cutoff permitting condition related to the vehicle speed has been satisfied because of almost zero of the vehicle speed VSP. In response thereto, the creep-cutoff permitting flag FLAG is set at 1 at t4. However, the creep toque continues to be outputted also after t4 without the creep cutoff, so that a torque reduction accompanied with strangeness feeling can be prevented.

4 Claims, 5 Drawing Sheets

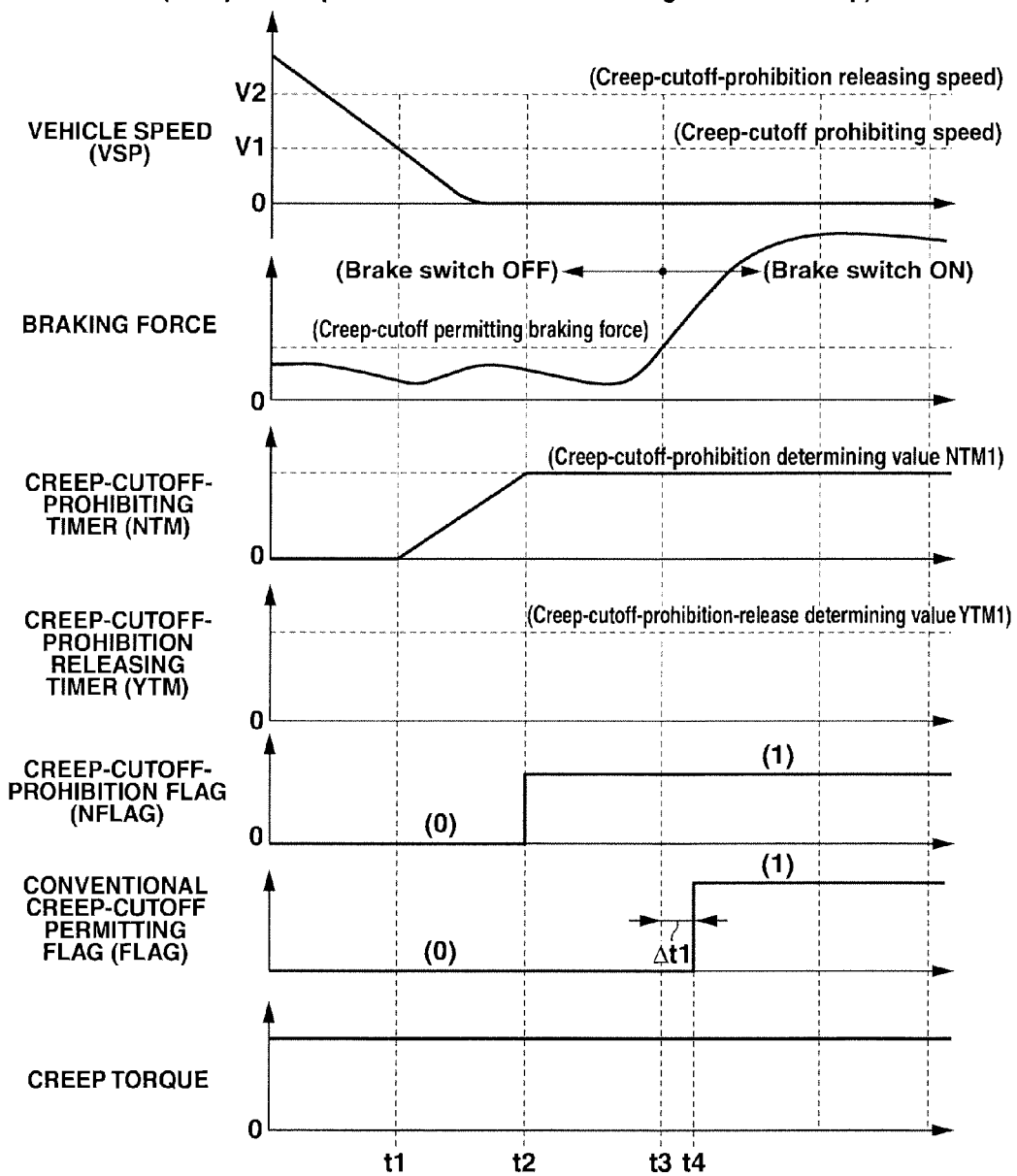

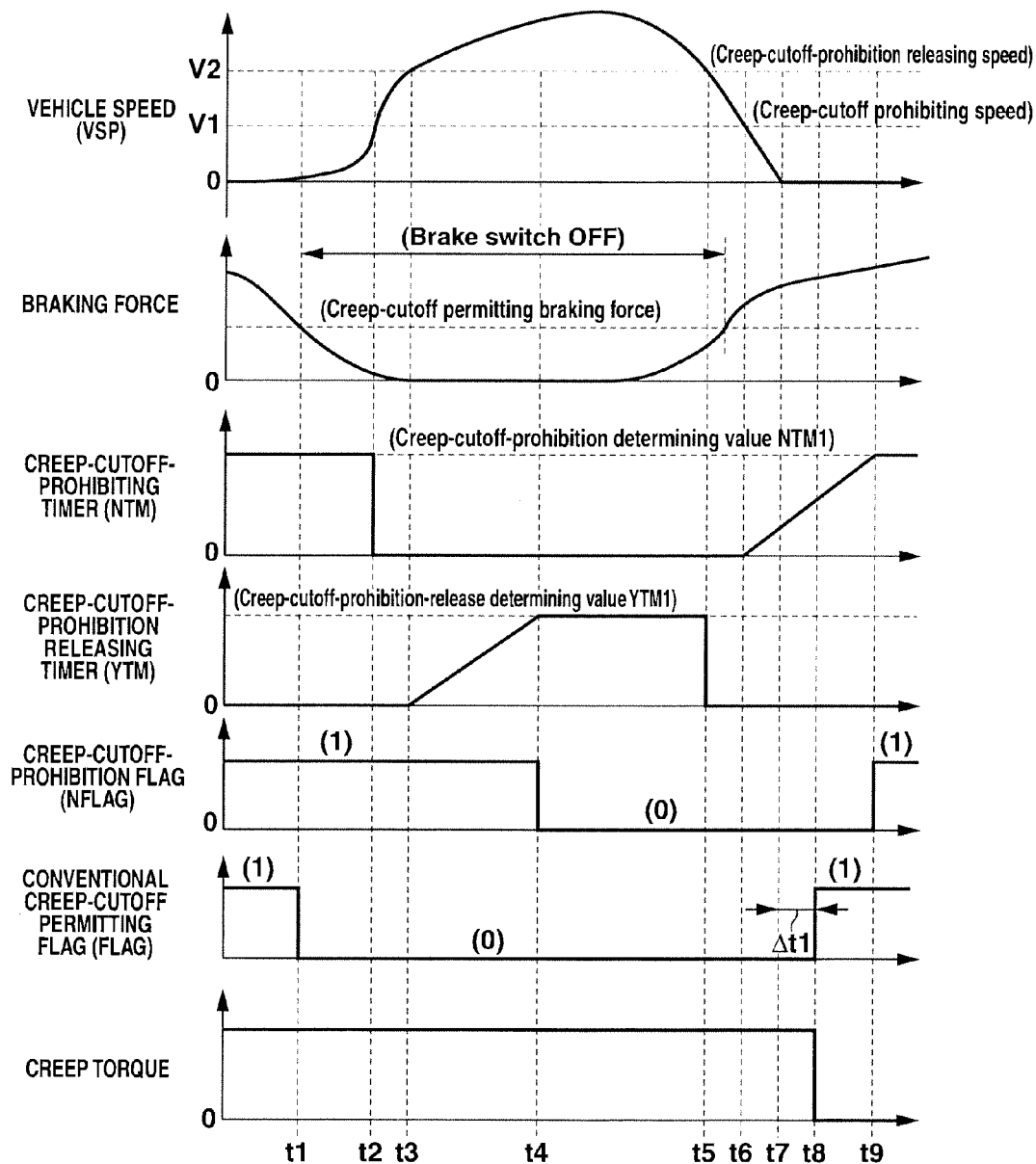

CREEP CUT-OFF CONTROL DEVICE FOR ELECTRIC VEHICLE

TECHNICAL FIELD

The present invention relates to improvement proposal of a creep cutoff control device provided in an electric vehicle such as a battery vehicle which uses only an electric motor as its power source and a hybrid vehicle which runs by use of energy from engine and electric motor.

BACKGROUND ART

An electric vehicle drives an electric motor in accordance with a range selected by a shift manipulation which is done by a driver to produce a running mode of the vehicle. By transmitting this power from the electric motor to road-wheels, an electric running can be realized.

When the electric vehicle is made to run at very low speed (is made to creep) by creep torque with a forward-or-reverse-running range selected as in the case of automatic-transmission vehicle; the electric motor is driven and controlled to output the minute creep torque from the electric motor, and this creep torque is transmitted to the road-wheels to enable the creep running of the electric vehicle.

For example, Patent Literature 1 proposes a creep-running control technique for an electric vehicle. In this technique, in addition to enabling the creep running of the electric vehicle as mentioned above, a creep cutoff which reduces the creep torque of the electric motor (down to zero) is performed when a predetermined creep-cutoff permitting condition is satisfied. This predetermined condition is that a detection value of vehicle speed is lower than a set value and also a braking force is larger than or equal to a set value, for example, when the vehicle is in a stopped state with no intention to start moving the vehicle. Such a creep cutoff is performed because the creep running is not conducted immediately and also because a power consumption can be suppressed.

However, in the creep-cutoff control device for electric vehicle as disclosed in Patent Literature 1, the creep cutoff which reduces the creep torque of the electric motor (down to zero) is unconditionally performed when the predetermined creep-cutoff permitting condition is satisfied, for example, when the vehicle is in a stopped state with no intention to start moving the vehicle. Therefore, the following problem is caused.

For example, a case will now be discussed where a driver is adjusting the vehicle speed around 0 by a delicate increase/decrease of braking force through a brake-pedal manipulation while the electric vehicle is outputting the creep torque in a forward direction because of the setting of forward-running range (DRIVE-mode).

In this case, the creep-cutoff permitting condition related to the vehicle speed has been satisfied because the vehicle speed is around 0. On the other hand, the creep-cutoff permitting condition related to the braking force is not satisfied because the braking force is being used to adjust the vehicle speed around 0 in relation to the minute creep torque and hence is not larger than or equal to the above-mentioned set value. Therefore, in this situation, the creep torque is being outputted from the electric motor without executing the creep cutoff.

If the driver increases the braking force carelessly or in order to stop the vehicle, the braking force becomes larger than or equal to the set value so that the creep-cutoff permitting condition related to the braking force is satisfied. At this time, both of the creep-cutoff permitting condition related to the vehicle speed and the creep-cutoff permitting condition related to the braking force are satisfied, so that the creep torque is rapidly brought to 0 by the execution of the creep cutoff.

Before the creep torque is brought to 0 by such a creep cutoff, the driver has focused his attention on adjusting the vehicle speed around 0 by the brake manipulation as mentioned above and hence is not aware of changing the torque at all. Therefore, when the creep torque is brought to 0 by the creep cutoff, the driver feels a torque reduction unrelated to his own driving manipulations, i.e., an unintended torque reduction. Hence, a problem is caused that the driver has a feeling of strangeness.

This problem is caused similarly also in a case that the driver is adjusting the speed of the electric vehicle around 0 by a delicate brake manipulation while the electric vehicle is outputting the creep torque in a reverse direction because of the setting of reverse-running range (REVERSE-mode).

CITATION LIST

Patent Literature

Patent Literature 1: Japanese Patent Application Publication No. 2010-093990

SUMMARY OF THE INVENTION

It is an object of the present invention to provide a creep cutoff control device for an electric vehicle, devised to solve the above-mentioned problem by embodying an idea that the problem can be solved in a case that the creep cutoff is prohibited not to execute the creep cutoff even if the creep-cutoff permitting condition is satisfied when the vehicle speed is within a predetermined low-speed region with the creep torque outputted.

For this purpose, according to the present invention, a creep-cutoff control device for an electric vehicle is constructed as follows. At first, the electric vehicle which is a basic precondition of a main structure according to the present invention will now be explained. This electric vehicle is configured to run by transmitting power from an electric motor to a road wheel in accordance with a shift range selected by a shift manipulation which is done by a driver to produce a running mode of the vehicle. Moreover, the electric vehicle is configured to creep at a very low speed by a creep torque derived from the electric motor. Moreover, the electric vehicle is configured to execute a creep cutoff such that the creep torque of the electric motor is reduced when a creep-cutoff permitting condition is satisfied. The creep-cutoff permitting condition is that an absolute value of a vehicle speed is lower than a vehicle-stop determining speed value and a braking force is larger than or equal to a set braking-force value.

For such an electric vehicle, the creep-cutoff control device according to the present invention includes a creep-cutoff-prohibiting speed-region judging means configured to judge whether or not the absolute value of the vehicle speed is lower than a creep-cutoff prohibiting speed value under a state where the creep torque is being outputted without executing the creep cutoff; and a creep-cutoff prohibiting means configured to prohibit the creep cutoff regardless of the satisfaction of the creep-cutoff permitting condition, when the creep-cutoff-prohibiting speed-region judging means determines that the absolute value of the vehicle speed is within a creep-cutoff-prohibiting speed-region. Moreover, the creep-cutoff-prohibiting speed-region judging means includes a creep-cutoff prohibiting timer configured to measure elapsed time for which the absolute value of the vehicle speed is smaller than the creep-cutoff prohibiting speed value. Moreover, the creep-cutoff prohibiting means is configured to prohibit the creep cutoff when the creep-cutoff prohibiting timer indicates a set time value.

According to such a creep-cutoff control device for an electric vehicle, the creep cutoff is prohibited irrespective of the satisfaction of the creep-cutoff permitting condition when the absolute value of the vehicle speed falls within the creep-cutoff-prohibiting speed-region which is smaller than the creep-cutoff prohibiting speed value under the outputted state of creep torque.

In the case that the creep cutoff is performed in this creep-cutoff-prohibiting speed-region, as mentioned above, the driver feels a torque reduction irrelevant to his driving manipulation with a strangeness feeling. This is because the creep cutoff is executed when the braking force is increased to satisfy the creep-cutoff permitting condition related to the braking force under a situation where the creep-cutoff permitting condition related to the vehicle speed has been satisfied whereas the creep-cutoff permitting condition related to the braking force has not yet been satisfied. However, according to the present invention, such a torque reduction causing the strangeness feeling can be prevented by prohibiting the creep cutoff.

BRIEF EXPLANATION OF DRAWINGS

FIG. 4 A time chart showing an operational situation by the control program of FIGS. 2 and 3, in a case that a vehicle speed of electric vehicle is maintained at a level around 0 by a delicate brake manipulation with a creep torque accompanied with a forward range, and then a braking force is increased up to a level enabling to satisfy a creep-cutoff permitting condition.

FIG. 5 A time chart showing an operational situation by the control program of FIGS. 2 and 3, in a case that a creep running is conducted from a state where a creep cutoff is being prohibited as shown in FIG. 4, and then the creep running is finished to stop the vehicle by manipulating the brake.

DETAILED DESCRIPTION OF INVENTION

Figure 1:
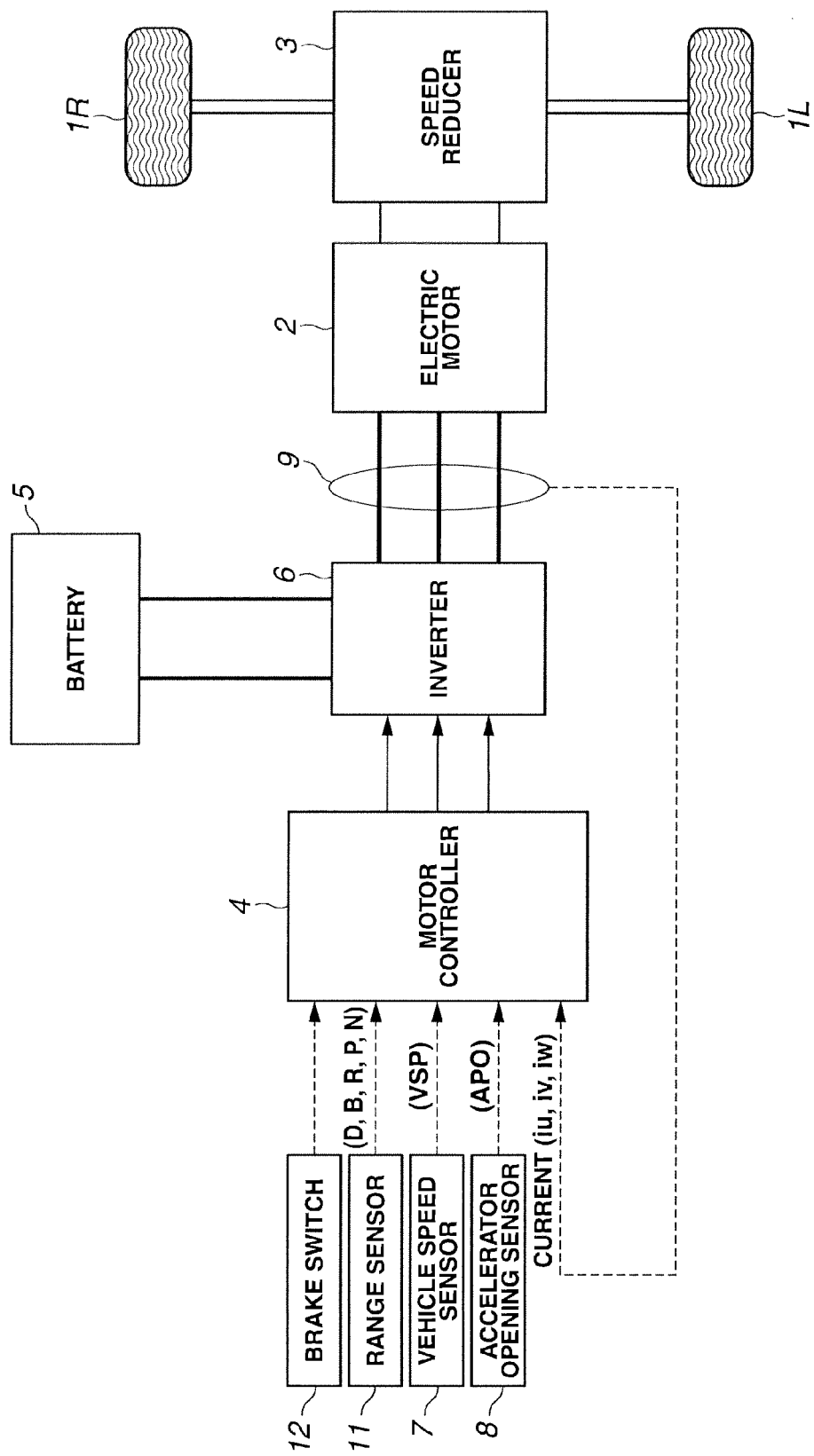
FIG. 1 A schematic system view showing a drive system and a control system for the drive system in a vehicle equipped with a creep cutoff control device in an embodiment according to the present invention FIG. 2 A flowchart showing a first-half part of a creep-cutoff control program which is executed by a motor controller shown in FIG. 1.

Hereinafter, embodiments according to the present invention will be explained in detail referring to the drawings.
<Configuration>
FIG. 1 is a view showing a drive system and a control system for the drive system in a vehicle equipped with a creep cutoff control device in an embodiment according to the present invention. The vehicle in this embodiment as shown in FIG. 1 is an electric-powered vehicle which can run by driving front left and right (road-)wheels 1L and 1R, or rear left and right (road-)wheels. These front left and right wheels 1L and 1R are driven by an electric motor 2 through a speed reducer 3 including a differential gear unit.

A battery 5 functions as an electric-power source. A motor controller 4 converts direct-current (DC) power of the battery 5 into alternate-current (AC) power by an inverter 6. This AC power is supplied to the electric motor 2 under a control of the inverter 6. Thereby, the electric motor 2 is controlled such that a torque of the electric motor 2 becomes equal to a calculation result (target motor-torque value) of the motor controller 4.

In a case that the calculation result (target motor-torque value) of the motor controller 4 is a creep torque responding to a creep running request of the vehicle, the motor controller 4 supplies a creep-torque-generating current to the electric motor 2 by use of the inverter 6. At this time, the electric motor 2 generates the creep torque, and transmits this creep torque through the speed reducer 3 to the left and right wheels 1L and 1R, so that the vehicle can run by creeping.

Moreover, in a case that the calculation result (target motor-torque value) of the motor controller 4 is a negative value for requiring the electric motor 2 to produce a regenerative braking, the motor controller 4 applies a power-generating load to the electric motor 2 by the inverter 6. At this time, electric power generated by the regenerative braking of the electric motor 2 is converted into direct-current (DC) power by AC-to-DC conversion of the inverter 6, and then is charged into the battery 5.

The motor controller 4 receives signals derived from a vehicle speed sensor 7, an accelerator opening sensor 8, an electric-current sensor 9, a range sensor 11 and a brake switch 12, as information for the above-mentioned calculation of the target motor-torque value. The vehicle speed sensor 7 senses a vehicle speed VSP which is a speed of the electric vehicle with respect to ground. The accelerator opening sensor 8 senses an accelerator opening APO (electric-motor-desired load) which is a depressed amount of accelerator pedal by a driver. The electric-current sensor 9 senses electric current (electric-current values iu, iv and iw of three-phase AC having U-phase, V-phase and W-phase in the case of FIG. 1) of the electric motor 2. The range sensor 11 senses which has been selected from a forward-running range (D-range, i.e., DRIVE-mode), a motor-speed limiting range (B-range, i.e., BRAKE-mode corresponding to Engine-brake mode in the case of automatic-transmission vehicle), a reverse running range (R-range, i.e., REVERSE-mode), a vehicle-stop range (N-range, i.e., NEUTRAL-mode) and a parking range (P-range, i.e., PARKING-mode), by a shift manipulation of the driver in order to produce a command for a running mode of the vehicle. That is, the range sensor 11 senses a currently-selected shift position. The brake switch 12 is turned on (becomes in ON-state) in response to a stroke level of brake pedal or a fluid-pressure level of master cylinder which causes a braking force to become greater than or equal to a set braking-force value (creep-cutoff-permitting braking-force value) provided for determining that the driver has no intention to start moving the vehicle.

The motor controller 4 produces a PWM signal for controlling the electric motor 2 in accordance with the received information, and produces a drive signal for the inverter 6 by use of drive circuit in accordance with the PWM signal. The inverter 6 includes, for example, two switching elements (e.g., power semiconductor elements such as IGBTs) per each phase. The inverter 6 turns on/off the respective switching elements in accordance with the drive signal, and thereby converts direct current supplied from the battery 5 into alternating current or converts alternating current from the electric motor 2 into direct current. Thus, the inverter 6 supplies electric current corresponding to the target motor-torque value, to the electric motor 2.

The electric motor 2 generates driving force according to the alternating current supplied from the inverter 6, and then transmits the driving force through the speed reducer 3 to the left and right wheels 1L and 1R. Moreover, when the electric motor 2 is dragged by the left and right wheels 1L and 1R during the vehicle running, i.e., at the time of so-called inverse drive, the electric motor 2 is given power-generating load so that the electric motor 2 performs the regenerative braking. Thereby, at this time, kinetic energy of the vehicle is regenerated and stored (charged) into the battery 5.

<Creep Cutoff Control>

Figure 2:
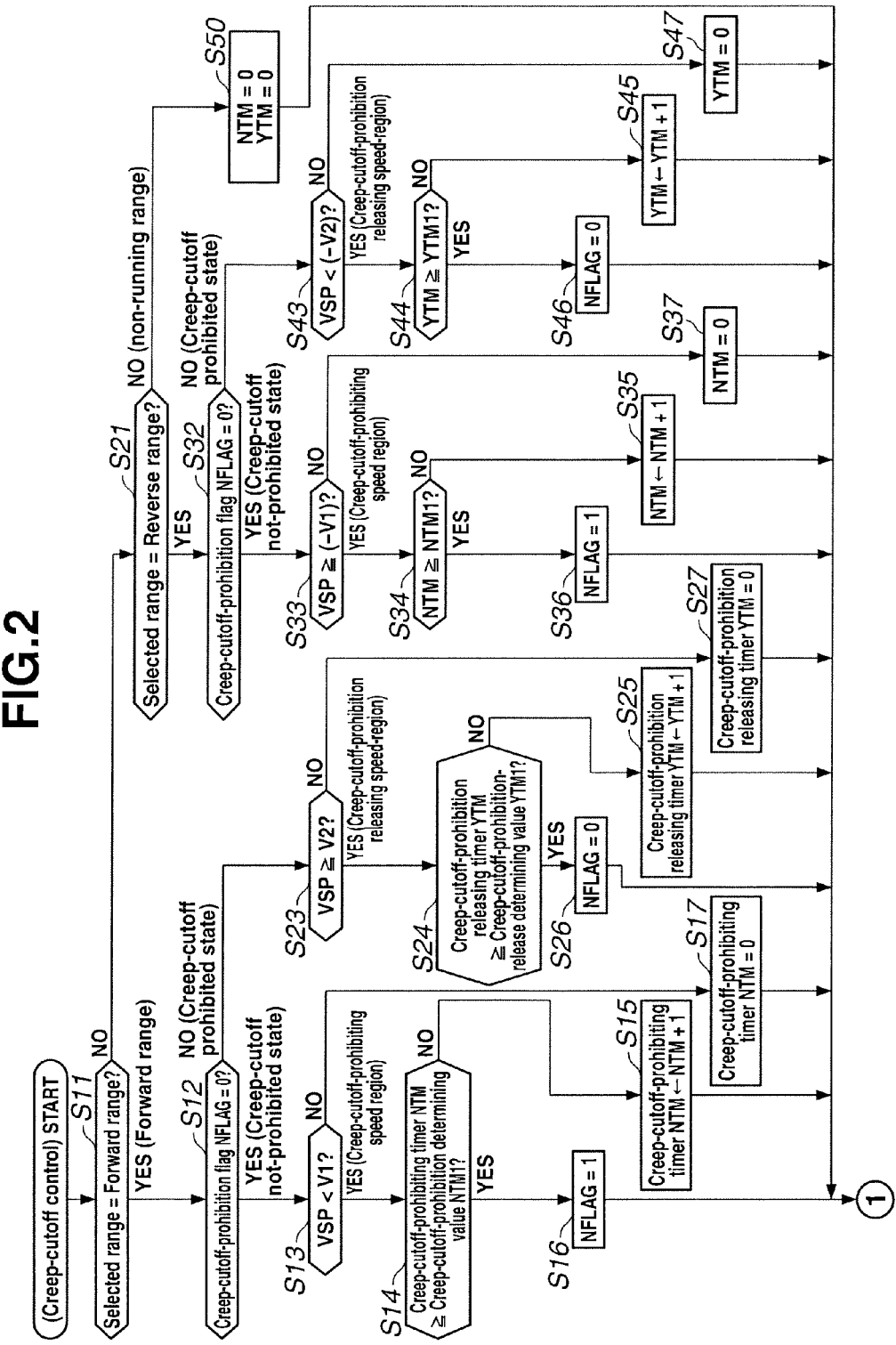
Figure 3:
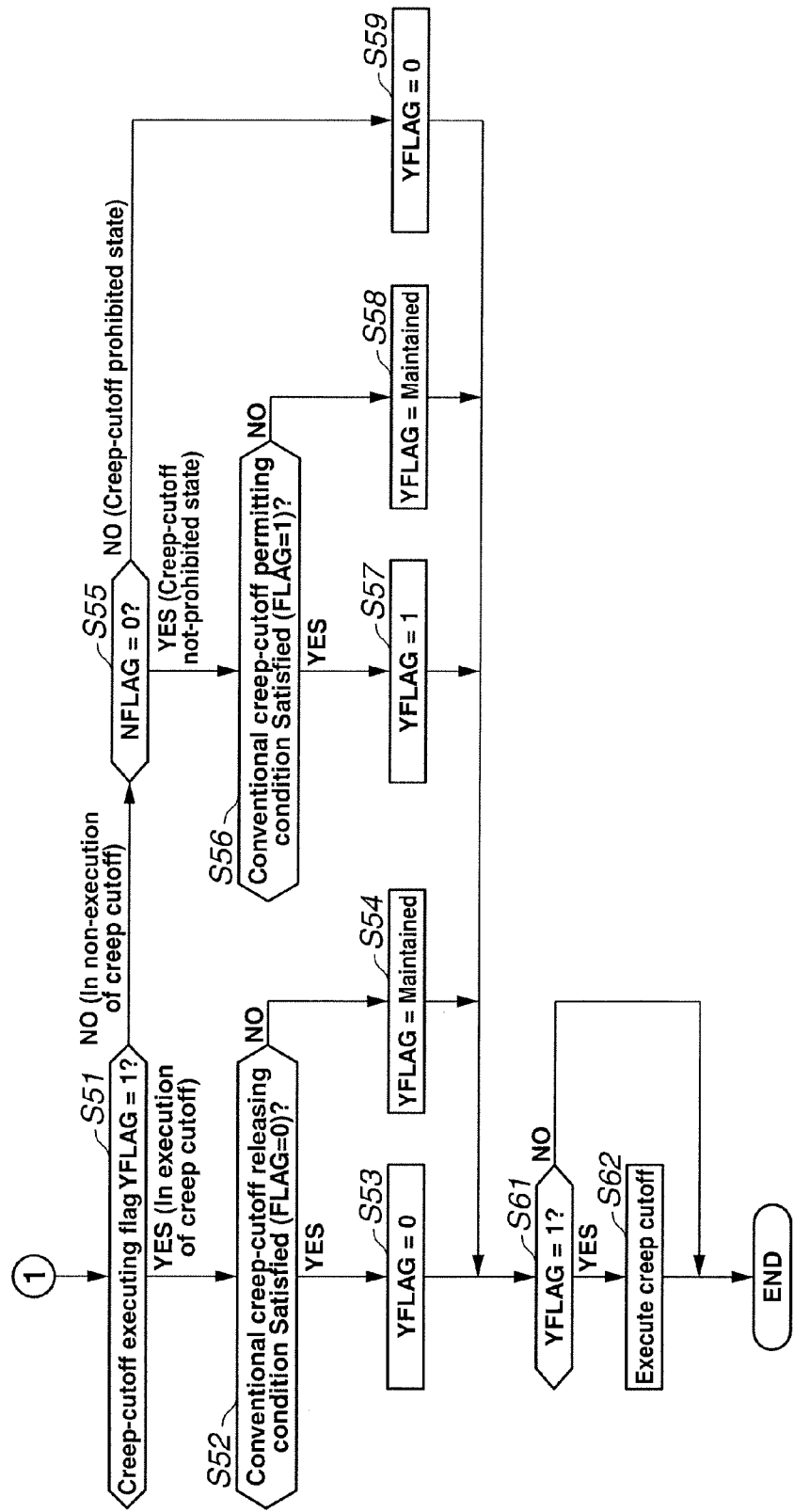
FIG. 3 A flowchart showing a second-half part of the creep-cutoff control program which is executed by the motor controller shown in FIG. 1.

The motor controller 4 performs a creep cutoff control by executing control programs shown in FIGS. 2 and 3. That is, the motor controller 4 calculates the target motor-torque values for creep running, and outputs commands thereof to the inverter 6, so that a drive control of the electric motor 2 for creep running is performed (including the creep cutoff control, a creep-cutoff prohibiting control, a creep-cutoff-prohibition releasing control).

The control programs of FIGS. 2 and 3 are repeatedly executed when an ignition switch of the electric vehicle is in ON-state (has been turned on). At step S11 of FIG. 2, it is judged whether or not a forward range such as the above-mentioned forward-running (D) range and the motor-speed limiting (B) range (corresponding to engine-brake range) is active (i.e., has been selected).

If it is determined that the forward range is not active at step S11, it is judged whether or not a reverse range such as the reverse running (R) range is active (i.e., has been selected) at step S21. If it is determined that the reverse range is not active at step S21, a non-running range such as the vehicle-stop (N) range and the parking (P) range is active (i.e., has been selected).

If it is determined that the forward range is active at step S11, the program proceeds to step S12 so that a prohibition or permission of the creep cutoff is decided as follows. At step S12, it is judged whether a creep-cutoff-prohibition flag NFLAG which is set as mentioned later indicates "0" or "1", i.e., false or true. Thereby, it is judged whether the creep cutoff is not (yet) being prohibited or is (already) being prohibited.

If the creep-cutoff-prohibition flag NFLAG indicates "0" (NFLAG=0, i.e., a creep-cutoff not-yet-prohibited state) at step S12, the program proceeds to step S13 in order to judge whether or not the creep cutoff should be prohibited, i.e., in order to judge whether or not the creep-cutoff-prohibition flag NFLAG should be set at "1" as follows. At first, at step S13, it is judged whether or not the vehicle speed VSP is within a creep-cutoff-prohibiting speed region which is lower than a creep-cutoff prohibiting speed (value) V1 provided for the forward range as shown in FIGS. 4 and 5.

Explanations about the creep-cutoff prohibiting speed V1 for the forward range as shown in FIGS. 4 and 5 will now be given. The vehicle speed sensor 7 of FIG. 1 which is used for the judgment on the creep-cutoff-prohibiting speed region detects a value of the vehicle speed VSP which includes a detection error due to noise. Therefore, in this embodiment, in the case that the value of vehicle speed VSP falls within a range from 0 to a value (V1: 0.2 km/h, for example) slightly larger than a magnitude of the detection error, this value of vehicle speed VSP is not used as threshold for the judgment on the creep-cutoff-prohibiting speed region. The judgment on the creep-cutoff-prohibiting speed region is carried out as follows.

In the case of forward range, a detection value of vehicle speed VSP during the creep running is a positive value. Hence, as shown in FIGS. 4 and 5, V1 denotes the creep-cutoff prohibiting speed. Moreover, a vehicle-speed region (VSP=0~V1) lower than the creep-cutoff prohibiting speed V1 for the forward range denotes the creep-cutoff-prohibiting speed region as shown in FIGS. 4 and 5.

It is noted that the creep-cutoff prohibiting speed V1 for the forward range is higher than a vehicle-stop determining speed value as a matter of course. This vehicle-stop determining speed value is used for judging whether or not a creep-cutoff permitting condition related to normal vehicle speed has been satisfied.

In this embodiment, as shown in FIGS. 4 and 5, a creep-cutoff-prohibition releasing speed (V2: 0.5 km/h, for example) for the forward range is set such that the creep-cutoff-prohibition releasing speed V2 is higher by a hysteresis amount (margin) than the creep-cutoff prohibiting speed V1 for the forward range. A vehicle-speed range (VSP≧V2) higher than or equal to the creep-cutoff-prohibition releasing speed V2 is defined as a creep-cutoff-prohibition releasing speed-region. By so setting, a hysteresis speed region exists between the creep-cutoff prohibiting speed V1 for the forward range and the creep-cutoff-prohibition releasing speed V2 for the forward range. Hence, a changeover hunting can be prevented from occurring between the prohibition of creep cutoff and the release of creep-cutoff prohibition.

In the case of reverse range, a detection value of vehicle speed VSP is a negative value. Hence, a value (−V1) set to have a polarity opposite to that in the case of forward range shown in FIGS. 4 and 5 denotes the creep-cutoff prohibiting speed. Moreover, 0>VSP≧(−V1) denotes the creep-cutoff-prohibiting speed region for the reverse range. A set value (−V2) denotes the creep-cutoff-prohibition releasing speed for the reverse range, and VSP<(−V2) denotes the creep-cutoff-prohibition releasing speed-region for the reverse range.

While it is determined that the vehicle speed VSP is within the creep-cutoff-prohibiting speed region (VSP<V1) at step S13, it is judged whether or not a creep-cutoff-prohibiting timer NTM has already indicated (has reached) a creep-cutoff-prohibition determining value NTM1 at step S14. This creep-cutoff-prohibiting timer NTM functions to measure an elapsed time from a timing when the vehicle speed VSP entered the creep-cutoff-prohibiting speed region. Until the indication of the creep-cutoff-prohibiting timer NTM reaches the creep-cutoff-prohibition determining value NTM1, the program proceeds to step S15. At step S15, the creep-cutoff-prohibiting timer NTM is incremented, and thereby a time length elapsed from the time point when the vehicle speed VSP entered the creep-cutoff-prohibiting speed region (given by VSP<V1) is measured.

When the creep-cutoff-prohibiting timer NTM becomes larger than or equal to the creep-cutoff-prohibition determining value NTM1 by the increment of the creep-cutoff-prohibiting timer NTM at step S15, namely, when the set time corresponding to the creep-cutoff-prohibition determining value NTM1 has elapsed from the timing when the vehicle speed VSP entered the creep-cutoff-prohibiting speed region; the program proceeds from step S14 to step S16. At step S16, the creep-cutoff-prohibition flag NFLAG is set at "1", so that the creep cutoff is prohibited. It is noted that steps S13 and S14 correspond to a creep-cutoff-prohibiting speed-region judging means according to the present invention, and step S16 corresponds to a creep-cutoff prohibiting means according to the present invention.

If it is determined that the vehicle speed VSP is out of the creep-cutoff-prohibiting speed region (defined by VSP<V1) at step S13, the program proceeds to step S17. At step S17, the creep-cutoff-prohibiting timer NTM is reset at "0".

If it is determined that the creep-cutoff-prohibition flag NFLAG indicates "1" (i.e., already prohibited state of creep cutoff) at step S12, the program proceeds to step S23 in order to judge whether or not the prohibition of creep cutoff should be released, i.e., whether or not the creep-cutoff-prohibition flag NFLAG should be set at "0", as follows. At first, at step S23, it is judged whether or not the vehicle speed VSP is within the creep-cutoff-prohibition releasing speed-region which is higher than or equal to the creep-cutoff-prohibition releasing speed V2 for the forward range as shown in FIGS. 4 and 5.

While it is determined that the vehicle speed VSP is within the creep-cutoff-prohibition releasing speed-region (defined by VSP≧V2) at step S23, it is judged whether or not a creep-cutoff-prohibition releasing timer YTM has already indicated (has reached) a creep-cutoff-prohibition-release determining value YTM1 at step S24. This creep-cutoff-prohibition releasing timer YTM functions to measure an elapsed time from a timing when the vehicle speed VSP entered the creep-cutoff-prohibition releasing speed-region. Until the indication of the creep-cutoff-prohibition releasing timer YTM reaches the creep-cutoff-prohibition-release determining value YTM1, the program proceeds to step S25. At step S25, the creep-cutoff-prohibition releasing timer YTM is incremented, and thereby a time length elapsed from the timing when the vehicle speed VSP entered the creep-cutoff-prohibition releasing speed-region (defined by VSP≧V2) is measured.

When the creep-cutoff-prohibition releasing timer YTM becomes larger than or equal to the creep-cutoff-prohibition-release determining value YTM1 by the increment of the creep-cutoff-prohibition releasing timer YTM at step S25, namely, when the set time corresponding to the creep-cutoff-prohibition-release determining value YTM1 has elapsed from the timing when the vehicle speed VSP entered the creep-cutoff-prohibition releasing speed-region (defined by VSP≧V2); the program proceeds from step S24 to step S26. At step S26, the creep-cutoff-prohibition flag NFLAG is reset at "0", so that the creep-cutoff prohibition is released. It is noted that steps S23 and S24 correspond to a creep-cutoff-prohibition releasing-speed-region judging means according to the present invention, and step S26 corresponds to a creep-cutoff-prohibition releasing means according to the present invention.

If it is determined that the vehicle speed VSP is out of the creep-cutoff-prohibition releasing speed-region (given by VSP≧V2) at step S23, the program proceeds to step S27. At step S27, the creep-cutoff-prohibition releasing timer YTM is reset at "0".

If it is determined that the reverse range such as R-range is active (i.e., has been selected) at step S21, the program proceeds to step S32 in order to conduct the permission/prohibition of the creep cutoff as follows. At step S32, it is judged whether the creep-cutoff-prohibition flag NFLAG (which is set as mentioned below) indicates "0" or "1". Thereby, it is judged whether the creep cutoff has not yet been prohibited or has already been prohibited.

If it is determined that the creep-cutoff-prohibition flag NFLAG indicates "0" (NFLAG=0) at step S32, the program proceeds to step S33 in order to judge whether or not the creep cutoff should be prohibited, i.e., whether or not the creep-cutoff-prohibition flag NFLAG should be set at "1" as follows. At first, at step S33, it is judged whether or not the vehicle speed VSP is within the creep-cutoff-prohibiting speed region which is larger than or equal to the first set value (−V1) provided for the reverse range.

While it is determined that the vehicle speed VSP is within the creep-cutoff-prohibiting speed region (defined by VSP≧−V1) at step S33, it is judged whether or not the creep-cutoff-prohibiting timer NTM has already indicated (has reached) the creep-cutoff-prohibition determining value NTM1 at step S34. This creep-cutoff-prohibiting timer NTM functions to measure an elapsed time from a timing when the vehicle speed VSP entered the creep-cutoff-prohibiting speed region (given by VSP≧−V1). Until the indication of the creep-cutoff-prohibiting timer NTM reaches the creep-cutoff-prohibition determining value NTM1, the program proceeds to step S35. At step S35, the creep-cutoff-prohibiting timer NTM is incremented, and thereby a time length elapsed from the timing when the vehicle speed VSP entered the creep-cutoff-prohibiting speed region (given by VSP≧−V1) is measured.

When the creep-cutoff-prohibiting timer NTM becomes larger than or equal to the creep-cutoff-prohibition determining value NTM1 by the increment of the creep-cutoff-prohibiting timer NTM at step S35, namely, when the set time corresponding to the creep-cutoff-prohibition determining value NTM1 has elapsed from the timing when the vehicle speed VSP entered the creep-cutoff-prohibiting speed region (given by VSP≧−V1); the program proceeds from step S34 to step S36. At step S36, the creep-cutoff-prohibition flag NFLAG is set at "1", so that the creep cutoff is prohibited. It is noted that steps S33 and S34 correspond to the creep-cutoff-prohibiting speed-region judging means according to the present invention, and step S36 corresponds to the creep-cutoff prohibiting means according to the present invention.

If it is determined that the vehicle speed VSP is not within the creep-cutoff-prohibiting speed region (given by VSP≧−V1) at step S33, the program proceeds to step S37. At step S37, the creep-cutoff-prohibiting timer NTM is reset at "0".

If it is determined that the creep-cutoff-prohibition flag NFLAG indicates "1" (i.e., already prohibited state of creep cutoff) at step S32, the program proceeds to step S43 in order to judge whether or not the prohibition of creep cutoff should be released, i.e., whether or not the creep-cutoff-prohibition flag NFLAG should be set at "0", as follows. At first, at step S43, it is judged whether or not the vehicle speed VSP is within the creep-cutoff-prohibition releasing speed-region which is lower than the second set value (−V2) provided for the reverse range mentioned above as compared with FIGS. 4 and 5.

While it is determined that the vehicle speed VSP is within the creep-cutoff-prohibition releasing speed-region (define by VSP<−V2) at step S43, it is judged whether or not the creep-cutoff-prohibition releasing timer YTM has already indicated (has reached) the creep-cutoff-prohibition-release determining value YTM1 at step S44. This creep-cutoff-prohibition releasing timer YTM functions to measure an elapsed time from a timing when the vehicle speed VSP entered the creep-cutoff-prohibition releasing speed-region (given by VSP<−V2). Until the indication of the creep-cutoff-prohibition releasing timer YTM reaches the creep-cutoff-prohibition-release determining value YTM1, the program proceeds to step S45. At step S45, the creep-cutoff-prohibition releasing timer YTM is incremented, and thereby a time length elapsed from the timing when the vehicle speed VSP entered the creep-cutoff-prohibition releasing speed-region (defined by VSP<−V2) is measured.

When the creep-cutoff-prohibition releasing timer YTM becomes larger than or equal to the creep-cutoff-prohibition-release determining value YTM1 by the increment of the creep-cutoff-prohibition releasing timer YTM at step S45, namely, when the set time corresponding to the creep-cutoffprohibition-release determining value YTM1 has elapsed from the timing when the vehicle speed VSP entered the creep-cutoff-prohibition releasing speed-region (defined by VSP<−V2); the program proceeds from step S44 to step S46. At step S46, the creep-cutoff-prohibition flag NFLAG is reset at "0", so that the creep-cutoff prohibition is released. It is noted that steps S43 and S44 correspond to the creep-cutoff-prohibition releasing-speed-region judging means according to the present invention, and step S46 corresponds to the creep-cutoff-prohibition releasing means according to the present invention.

If it is determined that the vehicle speed VSP is out of the creep-cutoff-prohibition releasing speed-region (given by VSP<−V2) at step S43, the program proceeds to step S47. At step S47, the creep-cutoff-prohibition releasing timer YTM is reset at "0".

If it is determined that the non-running range such as the vehicle-stop (N) range and the parking (P) range is active (i.e., has been selected) at step S21, the program proceeds to step S50. At step S50, both of the creep-cutoff-prohibiting timer NTM and the creep-cutoff-prohibition releasing timer YTM are reset at "0" in order to prepare for a next creep cutoff control.

After the prohibition/permission (status of the creep-cutoff-prohibition flag NFLAG) of the creep cutoff is determined individually about the forward range and the reverse range as mentioned above referring to FIG. 2, an actual execution/release (status of a creep-cutoff executing flag YFLAG) of the creep cutoff is determined by a processing of FIG. 3 based on the creep-cutoff-prohibition flag NFLAG and a conventionally-general permission/release (status of a conventional creep-cutoff permitting flag FLAG) of the creep cutoff.

At step S51 of FIG. 3, it is judged whether or not the creep-cutoff executing flag YFLAG set as mentioned below indicates "1", so that it is judged whether the creep cutoff is being actually executed or is not being actually executed (i.e., during execution or not). If the status of the creep-cutoff executing flag YFLAG is "1" (i.e., during execution of creep cutoff) at step S51, the program proceeds to step S52. At step S52, it is judged whether or not the conventional creep-cutoff permitting flag FLAG indicates "0". Thereby, it is checked whether or not a conventionally-general releasing condition for the creep cutoff has been satisfied (i.e., whether or not the creep torque should be outputted by cancelling the creep cutoff).

The conventionally-general releasing and permitting conditions for the creep cutoff will now be explained. The latter permitting condition for the creep cutoff means a vehicle-stopped state including no intention to start moving the vehicle. For example, it is determined that the creep-cutoff permitting condition is satisfied if the brake switch 12 of FIG. 1 is turned on in response to a stroke level of brake pedal or a fluid-pressure level of master cylinder which causes braking force to become greater than or equal to the set braking-force value and also if a state where the vehicle speed VSP is within a creep-cutoff speed region near 0 has continued for a predetermined time duration. Moreover, the former releasing condition for the creep cutoff means a timing when a preparatory operation to start moving the vehicle is carried out under the vehicle-stopped state. For example, it is determined that the creep-cutoff releasing condition is satisfied if the brake switch 12 of FIG. 1 is turned off in response to a stroke level of brake pedal or a fluid-pressure level of master cylinder which causes braking force to become smaller than the set braking-force value.

If it is determined that the conventionally-general creep-cutoff releasing condition has been satisfied at step S52, namely if it is determined that the creep torque should be outputted by releasing the creep cutoff; the program proceeds to step S53. At step S53, the creep-cutoff executing flag YFLAG is set at "0". Thereby, the creep torque is outputted without executing the creep cutoff.

However, if it is determined that the conventionally-general creep-cutoff releasing condition is not satisfied at step S52, the program proceeds to step S54. At step S54, the creep-cutoff executing flag YFLAG is maintained as it is. Thereby, current (present) execution/non-execution of the creep cutoff is continued.

If it is determined that the status of the creep-cutoff executing flag YFLAG is "0" (YFLAG=0) at step S51, namely if it is determined that the creep cutoff is not during execution; the program proceeds to step S55. At step S55, it is judged whether the status of the creep-cutoff-prohibition flag NFLAG is "0" or "1", so that it is judged whether the creep cutoff has not yet been prohibited or has already been prohibited. If the creep cutoff has not yet been prohibited (NFLAG=0), the program proceeds to step S56. At step S56, it is judged whether or not the conventionally-general creep-cutoff permitting condition is satisfied by judging whether or not the status of the conventional creep-cutoff permitting flag FLAG is "1". That is, at step S56, it is judged whether or not the creep torque should be made equal to 0 by the creep cutoff.

If it is determined that the conventionally-general creep-cutoff permitting condition is satisfied at step S56, namely, it is determined that the creep torque should be made equal to 0; the program proceeds to step S57. At step S57, the creep cutoff is executed not to output the creep torque, by setting the creep-cutoff executing flag YFLAG at "1".

On the other hand, if it is determined that the conventionally-general creep-cutoff permitting condition is not satisfied at step S56, the program proceeds to step S58. At step S58, the creep-cutoff executing flag YFLAG is maintained as it is. Thereby, current execution/non-execution of the creep cutoff is continued.

If it is determined that the status of the creep-cutoff-prohibition flag NFLAG is "1" (prohibited state of creep-cutoff) at step S55, the program proceeds to step S59. At step S59, the creep-cutoff executing flag YFLAG is set at "0", regardless of the conventionally-general creep-cutoff releasing or permitting condition as determined at steps S52 and S56. Thereby, the creep torque is outputted without executing the creep cutoff.

After the status of the creep-cutoff executing flag YFLAG (execution or release of the creep cutoff) is given at steps S53, S54 and S57-S59 as mentioned above, the program proceeds to step S61. At step S61, it is judged whether or not the status of the creep-cutoff executing flag YFLAG is "1". If the status of the creep-cutoff executing flag YFLAG is "1" (YFLAG=1) at step S61, the program proceeds to step S62. At step 62, the creep cutoff is carried out. If the status of the creep-cutoff executing flag YFLAG is not "1", the creep cutoff is released (cancelled) by not executing the process of step S62.

<Operations and Effects>

Representative operations and effects obtainable according to the creep cutoff control of this embodiment as shown in FIGS. 2 and 3 will now be explained in a case shown in FIGS. 4 and 5. That is, as shown by a time chart of FIG. 4, the speed of the electric vehicle is maintained around 0 by a delicate brake manipulation with the generation of creep torque in the forward range, and then, the braking force is increased up to a level enough to satisfy the creep-cutoff permitting condition. Afterward, as shown by a time chart of FIG. 5, a forward creep running is performed.

FIG. 4 is an operational time chart in the case that the driver maintains the vehicle speed VSP at a level around 0 by applying a slight braking force caused by a delicate brake manipulation while the creep torque is outputted from the electric motor 2 with the forward range selected as shown in FIG. 4, and then the braking force is increased to become larger than or equal to the creep-cutoff-permitting braking-force value, so that the electric vehicle is stopped.

The detection value of vehicle speed VSP enters the creep-cutoff-prohibiting speed region which is lower than the creep-cutoff prohibiting speed V1, by the initial brake manipulation at time point t1. At this time, the control program of FIG. 2 selects a loop including step S11, step S12, step S13, step S14 and step S15. By the process of step S15, the creep-cutoff-prohibiting timer NTM is incremented. Thereby, elapsed time is measured from the time pint t1 at which the detection value of vehicle speed VSP entered the creep-cutoff-prohibiting speed region (defined by VSP<V1).

At time point t2, the indication of the creep-cutoff-prohibiting timer NTM reaches the creep-cutoff-prohibition determining value NTM1. At this time, it is determined that the detection value of vehicle speed VSP has entered the creep-cutoff-prohibiting speed region (lower than the creep-cutoff prohibiting speed V1) under the output state of creep torque, at step S14. Thereby, the program proceeds from step S14 to step S16. As a result, at the time point t2, the creep-cutoff-prohibition flag NFLAG is set at "1", so that a prohibiting command of the creep cutoff is issued.

At time point t3, the driver increases the braking force up to a level larger than or equal to the creep-cutoff permitting braking-force value carelessly or in order to stop the electric vehicle. In response thereto, the brake switch 12 is turned on. From this signal of the brake switch 12, it can be judged whether or not the creep-cutoff permitting condition related to the braking force is satisfied.

When a predetermined time period Δt1 has just elapsed from the time point t3 at which the creep-cutoff permitting condition related to the braking force was satisfied (i.e., at which the brake switch 12 was turned on), the conventional creep-cutoff permitting flag FLAG is set at "1" at time point t4 as shown in FIG. 4 because both of the creep-cutoff permitting condition related to the braking force and the creep-cutoff permitting condition related to the vehicle speed VSP have been satisfied.

However, because the status of the creep-cutoff-prohibition flag NFLAG is "1" since the time point t2, the control program of FIG. 3 selects a loop including step S51, step S55 and step S59. By the process of step S59, the creep-cutoff executing flag YFLAG is set at "0". Thus, although the conventional creep-cutoff permitting flag FLAG is set at "1" at the time point t4 as mentioned above, the creep cutoff is prohibited so that the creep torque continues to be outputted also after time point t4 as shown in FIG. 4.

That is, according to this embodiment, in the case that it is detected that the detection value of vehicle speed VSP has entered the creep-cutoff-prohibiting speed region lower than the creep-cutoff prohibiting speed V1 with creep torque being outputted (time point t1) and then this state has continued for the time duration set corresponding to the creep-cutoff-prohibition determining value NTM1 for the timer (time point t2); it is determined that the detection value of vehicle speed VSP has sufficiently entered the creep-cutoff-prohibiting speed region lower than the creep-cutoff prohibiting speed V1. Hence, at step S16, the creep-cutoff-prohibition flag NFLAG is set at "1" to prohibit the creep cutoff. Accordingly, even if the conventional creep-cutoff permitting flag FLAG is set at "1" at the time point t4 in response to the braking force increased up to a level larger than or equal to the creep-cutoff permitting braking-force value (turn-on of the brake switch 12) at the time point t3, the creep cutoff is not performed so that the creep torque continues to be outputted also after the time point t4 as shown in FIG. 4.

Supposing that the creep cutoff is realized in response to FLAG=1 of the time point t4, the driver has a feeling of strangeness because a torque reduction caused due to this creep cutoff is unrelated to the driving manipulations of the driver, i.e., is not intended by the driver as mentioned above. However, according to this embodiment, the torque reduction accompanied with the strangeness feeling can be prevented from occurring because the creep torque continues to be outputted by prohibiting the creep cutoff also after the time point t4 as shown in FIG. 4.

Moreover, in this embodiment, it is determined that the detection value of vehicle speed VSP has entered the creep-cutoff-prohibiting speed region in the case that the detection value of vehicle speed VSP becomes lower than the creep-cutoff prohibiting speed V1 which is slightly larger than a value obtained by adding the detection error of the vehicle speed sensor 7 to 0, but not in the case that the detection value of vehicle speed VSP becomes 0. Accordingly, the judgment can be accurately conducted because the detection error of the vehicle speed sensor 7 is eliminated. Therefore, the above-mentioned advantageous effects can be more enhanced.

Moreover, in this embodiment, it is determined that the detection value of vehicle speed VSP has already entered the creep-cutoff-prohibiting speed region when the time duration set corresponding to the creep-cutoff-prohibition determining value NTM1 has elapsed under the state where the detection value of vehicle speed VSP is lower than the creep-cutoff prohibiting speed V1 (at the time point t2), but not immediately when the detection value of vehicle speed VSP becomes lower than the creep-cutoff prohibiting speed V1 (at the time point t1). Also from this viewpoint, the judgment can be accurately carried out so that the above-mentioned advantageous effects can be enhanced.

Since the vehicle is stopped by the increase of braking force after the time point t3, the detection value of vehicle speed VSP remains lower than the creep-cutoff prohibiting speed V1 also after the time point t4. Since the creep-cutoff-prohibition flag NFLAG is not set at "0" unless the detection value of vehicle speed VSP becomes higher than or equal to the creep-cutoff-prohibition releasing speed V2 as explained by the steps S23, S24 and S26 of FIG. 2, the creep-cutoff-prohibition flag NFLAG is maintained at "1". Thereby, the prohibition of the creep cutting continues to be performed also after the time point t4.

FIG. 5 is an operational time chart in the case that the braking force is reduced from the state where the creep cutoff is prohibited under the forward range as shown in FIG. 4 so that the creep running is realized to vary with time the detection value of vehicle speed VSP as shown in FIG. 5, and then the braking force is gradually increased so that the detection value of vehicle speed VSP is reduced in order to finish the creep running and thereby to stop the vehicle as shown in FIG. 5.

At time point t1 at which the braking force becomes lower than the creep-cutoff permitting braking-force value by the above-mentioned initial reduction of the braking force, the brake switch 12 is changed from ON state to OFF state. Thereby, the creep-cutoff permitting condition related to the braking force comes not to be satisfied, so that the conventional creep-cutoff permitting flag FLAG is reset at "0" at the time point t1.

At time point t2, the detection value of vehicle speed VSP becomes higher than or equal to the creep-cutoff prohibiting speed V1 by the creep running produced by the reduction of the braking force. Thereby, the detection value of vehicle speed VSP gets out of the creep-cutoff-prohibiting speed region and enters the hysteresis speed region, so that the control program of FIG. 2 selects the steps S13 and S17. By executing the process of step S17, the creep-cutoff-prohibiting timer NTM is reset at 0 as shown in FIG. 5.

At time point t3, the detection value of vehicle speed VSP becomes higher than or equal to the creep-cutoff-prohibition releasing speed V2 by a further rise of the vehicle speed VSP caused by the creep running. Thereby, the control program of FIG. 2 selects a loop including steps S11, S12, S23, S24 and S25. By executing the process of step S25, the creep-cutoff-prohibition releasing timer YTM is incremented, and thereby, elapsed time from the time point t3 at which the vehicle speed VSP entered the creep-cutoff-prohibition releasing speed-region (defined by VSP≧V2) is measured.

At time point t4 at which the indication of the creep-cutoff-prohibition releasing timer YTM reaches the creep-cutoff-prohibition-release determining value YTM1, the process of step S24 recognizes that the detection value of vehicle speed VSP has already entered the creep-cutoff-prohibition releasing speed-region, so that the program proceeds from step S24 to S26. Hence, the creep-cutoff-prohibition flag NFLAG is reset at "0" at the time point t4 as shown in FIG. 5, so that a prohibition-releasing command of the creep cutoff is issued. At time point t5 at which the vehicle speed VSP becomes lower than the creep-cutoff-prohibition releasing speed V2, the creep-cutoff-prohibition releasing timer YTM is reset at "0" at step S27.

As shown in FIG. 5, the conventional creep-cutoff permitting flag FLAG is set at "1" when both of the creep-cutoff permitting condition related to the vehicle speed VSP and the creep-cutoff permitting condition of ON-state (braking) of the brake switch 12 have been satisfied. More specifically, the conventional creep-cutoff permitting flag FLAG is not set at "1" until time point t8 at which a predetermined time period Δt1 has elapsed from time point t7 at which the vehicle stopped. Hence, the status of the conventional creep-cutoff permitting flag FLAG is still "0" at the time point t4 at which the prohibition-releasing command of the creep cutoff is issued.

Therefore, from the time point t1 to the time point t4 of FIG. 5, the control program of FIG. 3 selects a loop including steps S51, S55 and S59. From the time point t4 to the time point t8 of FIG. 5, the control program of FIG. 3 selects a loop including steps S51, S55, S56 and S58. That is, from the time point t1 to the time point t8 of FIG. 5, the creep-cutoff executing flag YFLAG is maintained at "0" so that the creep cutoff is not conducted. Thus, the creep running can be realized by continuously outputting the creep torque as shown in FIG. 5.

At the time point t6 of FIG. 5, the detection value of vehicle speed VSP enters the creep-cutoff-prohibiting speed region which is lower than the creep-cutoff prohibiting speed V1. At this time, the control program of FIG. 2 selects a loop including steps S11, S12, S13, S14 and S15. By executing the process of step S15, the creep-cutoff-prohibiting timer NTM is incremented so that elapsed time is measured from the time point t6 at which the vehicle speed VSP enters the creep-cutoff-prohibiting speed region defined by VSP<V1.

At time point t9 at which the creep-cutoff-prohibiting timer NTM reaches the creep-cutoff-prohibition determining value NTM1, the process of step S14 determines that the vehicle speed has already entered the creep-cutoff-prohibiting speed region (defined by VSP<V1) with the creep torque outputted. Thereby, the program proceeds from step S14 to step S16. Hence, the creep-cutoff-prohibition flag NFLAG is set at "1" so that the prohibiting command of the creep cutoff is issued at the time point t9.

From the time point t8 to the time point t9 of FIG. 5, the status of the creep-cutoff-prohibition flag NFLAG is "0", and the status of the conventional creep-cutoff permitting flag FLAG is "1" as mentioned above. Hence, during the time period between t8 and t9; at first, the control program of FIG. 3 selects a loop including steps S51, S55, S56 and S57 so that the creep-cutoff executing flag YFLAG is set at "1", and then, the control program of FIG. 3 selects a loop including steps S51, S52 and S54 so that the creep-cutoff executing flag YFLAG is maintained at "1". Accordingly, from the time point t8 to the time point t9 of FIG. 5, the creep torque is made to be equal to 0 by executing the creep cutoff in response to the status "1" of the creep-cutoff executing flag YFLAG.

After the time point t9, the control program of FIG. 3 selects the loop including steps S51, S52 and S54, so that the creep cut is continued. Hence, the creep torque remains equal to 0 ongoingly.

According to this embodiment, it is detected that the detection value of vehicle speed VSP has become higher than or equal to the creep-cutoff-prohibition releasing speed V2 during the prohibition of the creep cutting (time point t3). Then, when the state where the detection value of vehicle speed VSP is higher than or equal to the creep-cutoff-prohibition releasing speed V2 has continued for the predetermined time period corresponding to the creep-cutoff-prohibition-release determining value YTM1 (time point t4), the prohibition of the creep cutoff is released (cancelled) by setting the creep-cutoff-prohibition flag NFLAG at "0" at step S26. Afterwards, a normal creep-cutoff control according to the conventional creep-cutoff permitting flag FLAG can be performed without the strangeness feeling, as shown by the period t8 to t9 of FIG. 5.

Moreover, according to this embodiment, it is determined that the detection value of vehicle speed VSP has entered the creep-cutoff-prohibition releasing speed-region in the case that the detection value of vehicle speed VSP becomes higher than or equal to the creep-cutoff-prohibition releasing speed V2 which is slightly larger than a value obtained by adding the detection error of the vehicle speed sensor 7 to the creep-cutoff prohibiting speed V1, but not in the case that the detection value of vehicle speed VSP becomes equal to the creep-cutoff prohibiting speed V1. Accordingly, the judgment can be accurately conducted because the detection error of the vehicle speed sensor 7 is eliminated. Therefore, the above-mentioned advantageous effects can be more enhanced.

Moreover, according to this embodiment, it is determined that the detection value of vehicle speed VSP has already entered the creep-cutoff-prohibition releasing speed-region when the time duration set corresponding to the creep-cutoff-prohibition-release determining value YTM1 has elapsed under the state where the detection value of vehicle speed VSP is higher than or equal to the creep-cutoff-prohibition releasing speed V2 (at the time point t4). That is, it is not determined that the electric vehicle has moved in the forward direction immediately when the detection value of vehicle speed VSP becomes higher than or equal to the creep-cutoff-prohibition releasing speed V2 (at the time point t3). Also from this viewpoint, the judgment can be accurately carried out so that the above-mentioned advantageous effects can be more enhanced.

In the above embodiment, operations and effects have been explained only in the case where the forward range is being selected as a representative example, referring to FIGS. 4 and 5. However, even in the case where the reverse range is being selected, the control program of FIG. 2 proceeds from the step S21 to step S32 and selects a loop including steps S33 to S47. Then, the control of FIG. 3 is performed. Therefore, operations and effects similar to those in the case of forward range can be attained.

Moreover, the "creep cutoff" according to the embodiment of the present invention is not limited to bringing the creep torque to 0. The "creep cutoff" according to the embodiment may be a structure in which the creep torque is brought down to a level further smaller than a normal small value for the creep running.

What is claimed is:

1. A creep cutoff control device for an electric vehicle,
    wherein the electric vehicle is configured to run by transmitting power from an electric motor to a road wheel in accordance with a shift range selected by a shift manipulation which is done by a driver to produce a running mode of the vehicle,
    wherein the electric vehicle is configured to creep at a very low speed by a creep torque derived from the electric motor,
    wherein the electric vehicle is configured to execute a creep cutoff such that the creep torque of the electric motor is reduced when a creep-cutoff permitting condition is satisfied, the creep-cutoff permitting condition being that an absolute value of a vehicle speed is lower than a vehicle-stop determining speed value and that a braking force is larger than or equal to a set braking-force value,
    the creep cutoff control device comprising:
    a creep-cutoff-prohibiting speed-region judging section configured to judge whether or not the absolute value of the vehicle speed is lower than a creep-cutoff prohibiting speed value under a state where the creep torque is being outputted without executing the creep cutoff; and
    a creep-cutoff prohibiting section configured to prohibit the creep cutoff regardless of the satisfaction of the creep-cutoff permitting condition, when the creep-cutoff-prohibiting speed-region judging section determines that the absolute value of the vehicle speed is within a creep-cutoff-prohibiting speed-region,
    wherein the creep-cutoff-prohibiting speed-region judging section includes a creep-cutoff prohibiting timer configured to measure elapsed time for which the absolute value of the vehicle speed is lower than the creep-cutoff prohibiting speed value,
    wherein the creep-cutoff prohibiting section is configured to prohibit the creep cutoff when the creep-cutoff prohibiting timer indicates a set time value.

2. The creep cutoff control device according to claim 1, wherein the creep cutoff control device further comprises:
    a creep-cutoff-prohibition releasing-speed-region judging section configured to judge whether or not the absolute value of the vehicle speed has become higher than or equal to a creep-cutoff-prohibition releasing speed value which is higher than the creep-cutoff prohibiting speed value, when the creep-cutoff prohibiting section is prohibiting the creep cutoff; and
    a creep-cutoff-prohibition releasing section configured to allow the creep cutoff to be performed at the time of satisfaction of the creep-cutoff permitting condition by releasing the prohibition of the creep cutoff of the creep-cutoff prohibiting section, when the creep-cutoff-prohibition releasing-speed-region judging section determines that the absolute value of the vehicle speed has entered a creep-cutoff-prohibition releasing speed-region during the prohibition of the creep cutoff.

3. The creep cutoff control device according to claim 2, wherein
    the creep-cutoff-prohibition releasing-speed-region judging section includes a creep-cutoff-prohibition releasing timer configured to measure elapsed time for which the absolute value of the vehicle speed is higher than or equal to the creep-cutoff-prohibition releasing speed value, and
    the creep-cutoff-prohibition releasing section is configured to release the prohibition of the creep cutoff when the creep-cutoff-prohibition releasing timer indicates a set time value.

4. The creep cutoff control device according to claim 1, wherein
    the creep-cutoff prohibiting speed value is higher than the vehicle-stop determining speed value.

* * * * *